United States Patent
Asai et al.

(10) Patent No.: US 9,680,231 B2
(45) Date of Patent: Jun. 13, 2017

(54) PROXIMITY WIRELESS COMMUNICATION DEVICE

(71) Applicant: Panasonic Intellectual Property Corporation of America, Torrance, CA (US)

(72) Inventors: Koji Asai, Osaka (JP); Takeshi Nakayama, Hyogo (JP); Hiroshi Kanno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 352 days.

(21) Appl. No.: 14/631,803

(22) Filed: Feb. 25, 2015

(65) Prior Publication Data

US 2015/0255880 A1 Sep. 10, 2015

(30) Foreign Application Priority Data

Mar. 6, 2014 (JP) .................................. 2014-043523

(51) Int. Cl.
  *H04B 5/00* (2006.01)
  *H04B 7/00* (2006.01)
  (Continued)

(52) U.S. Cl.
  CPC ............... *H01Q 21/00* (2013.01); *H01Q 1/24* (2013.01); *H01Q 7/06* (2013.01); *H04B 5/0031* (2013.01);
  (Continued)

(58) Field of Classification Search
  CPC .......... B62M 6/45; G07C 5/006; G07C 5/008; G07C 5/085; G06K 19/071; G06K 19/072;
  (Continued)

(56) References Cited

U.S. PATENT DOCUMENTS

2008/0062066 A1* 3/2008 Arai ..................... H01Q 1/2208
  343/867
2009/0141179 A1* 6/2009 Jung ..................... H01Q 1/246
  348/723
(Continued)

FOREIGN PATENT DOCUMENTS

| DE | 102010027620 | 1/2012 |
| JP | 2008-301183 | 12/2008 |
| JP | 2009-200750 | 9/2009 |

OTHER PUBLICATIONS

The Extended European Search Report dated Jul. 3, 2015 for the related European Patent Application No. 15156268.3.

*Primary Examiner* — Yuwen Pan
*Assistant Examiner* — Paul P Tran
(74) *Attorney, Agent, or Firm* — Greenblum & Bernstein, P.L.C.

(57) ABSTRACT

A proximity wireless communication device includes a first housing and a second housing, and they are provided with respective two antennas. In the first housing, a first antenna and a second antenna are configured to be disposed on different parallel planes, and in the second housing, a third antenna and a fourth antenna are configured to be disposed on different parallel planes. Then, the first antenna and the third antenna carry out non-contact near-field wireless communication facing in proximity and the second antenna and the fourth antenna carry out non-contact near-field wireless communication facing in proximity.

11 Claims, 12 Drawing Sheets

(51) Int. Cl.
*H04M 1/00* (2006.01)
*H01F 38/00* (2006.01)
*H02J 7/00* (2006.01)
*H01Q 1/24* (2006.01)
*H04N 7/18* (2006.01)
*H04N 5/225* (2006.01)
*H04N 5/38* (2006.01)
*G03B 17/24* (2006.01)
*G03B 17/00* (2006.01)
*H04N 7/16* (2011.01)
*H01Q 21/00* (2006.01)
*H01Q 7/06* (2006.01)

(52) U.S. Cl.
CPC ......... *H04B 5/0037* (2013.01); *H04B 5/0075* (2013.01); *H04B 5/0087* (2013.01)

(58) Field of Classification Search
CPC ........ H01Q 1/1257; H01Q 1/243; H01Q 1/24; H01Q 3/24; H02J 5/005; H02J 7/025; H04B 5/0031; H04B 5/0037; H04B 5/0056; H04B 5/0075; H04B 5/0081; H04B 5/0087; H04M 1/0202; H04W 4/008; H04W 52/281; H04N 21/21805; H04N 21/2187; H04N 21/41415; H04N 21/6106; H04N 21/612
USPC ............. 455/41.1, 41.2, 150.1, 154.1, 166.1, 455/166.2, 188.1, 519, 552.1, 556.1, 455/569.1, 575.2, 62; 307/104; 320/108; 343/702; 348/14.01, 143, 211.99, 340, 348/373, 723; 396/320, 427; 700/295; 725/62
See application file for complete search history.

(56) References Cited

U.S. PATENT DOCUMENTS

| | | | |
|---|---|---|---|
| 2009/0271047 A1* | 10/2009 | Wakamatsu | H02J 5/005 700/295 |
| 2011/0025264 A1* | 2/2011 | Mochida | H01M 10/425 320/108 |
| 2011/0304218 A1 | 12/2011 | Hyland et al. | |
| 2012/0122400 A1* | 5/2012 | Kitagawa | H04B 5/0031 455/41.2 |
| 2012/0223588 A1* | 9/2012 | Suzuki | H02J 5/005 307/104 |
| 2013/0252661 A1 | 9/2013 | Holz et al. | |
| 2014/0125141 A1* | 5/2014 | Shinohe | H01Q 1/2266 307/104 |
| 2014/0306656 A1* | 10/2014 | Tabata | H01F 38/14 320/108 |
| 2015/0045091 A1* | 2/2015 | Nakatani | H04B 5/0031 455/556.1 |

* cited by examiner

PROXIMITY WIRELESS COMMUNICATION DEVICE

BACKGROUND

1. Technical Field

The present disclosure relates to a proximity wireless communication device that performs a plurality of communication sessions using a plurality of antennas.

2. Description of the Related Art

In recent years, for designing a device configured with two blocks, when data communication between both blocks is required, non-contact near-field wireless communication utilizing electromagnetic field coupling is sometimes used for the purpose of simplification of device design and cost reduction.

Japanese Unexamined Patent Application Publication No. 2008-301183 discloses a camera device. This camera device is configured with a mounting unit and a rotation unit capable of revolving relative to the mounting unit, and the rotation unit is equipped with a camera. This camera device is provided with a first coil of the mounting unit and a second coil of the rotation unit that are arranged facing each other. This enables power supply and exchange of an image signal taken by the camera equipped with the mounting unit by non-contact communication due to mutual induction, and thus it is possible to eliminate a cable across the mounting unit and the rotation unit of the camera.

SUMMARY

It is considered that the camera described in Japanese Unexamined Patent Application Publication No. 2008-301183 is connected to a network to watch a video of the camera over the network. In this case, it is considered that the mounting unit is equipped with a port for network connection and imaging data that is taken from the camera is sent in proximity wireless communication from the rotation unit to the mounting unit to send the imaging data from the port to external network. At this time, in Japanese Unexamined Patent Application Publication No. 2008-301183, ferrite is equipped between a feed antenna and a communication antenna to separate both antennas, thereby not affecting the communication. However, with such configuration, problems, such as an increase in costs for the entire system because ferrite is used and an increase in housing size due to an installation space required to provide them, occur.

One non-limiting and exemplary embodiment provides a proximity wireless communication device that is, in communication between communication blocks to carry out a plurality of communication sessions in parallel, capable of reducing influence of electromagnetic field generated by one communication session to electromagnetic field of the other communication session and capable of preferred wireless communication.

In one general aspect, the techniques disclosed here feature a proximity wireless communication device according to the present disclosure including: a first communication block and a second communication block, in which the first communication block has a first surface and a projection equipped in a part of the first surface, and a first antenna is disposed on an upper surface of the projection and a second antenna is disposed on the first surface, the second communication block has a second surface and a recess equipped in a part of the second surface, and a third antenna is disposed on a bottom surface of the recess and a fourth antenna is disposed on the second surface, the first surface and the second surface face in proximity, the projection and the recess fit, and the upper surface of the projection and the bottom surface of the recess face in proximity, and non-contact near-field wireless communication is carried out between the first antenna and the third antenna and between the second antenna and the fourth antenna.

According to the configuration as described above, it is possible to reduce influence of electromagnetic field formed by one pair of antennas to electromagnetic field formed by the other pair of antennas and it is possible to perform preferred wireless communication. Since it is possible to eliminate or reduce a ferrite material, the entire device does not increase in size. Further, it is also possible to easily carry out positioning of antennas by a structure of fitting convexity and concavity and thus it contributes to improvement in communication accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

<Underlying Knowledge Forming Basis of the Present Disclosure>

In Japanese Unexamined Patent Application Publication No. 2008-301183 above, a coil to carry out communication and a coil to carry out feeding are equipped on an identical plane in proximity. This is assumed to take ease of fabrication of the device into account.

Non-contact communication using electromagnetic field coupling is characterized by being capable of high speed bulk data transfer at low power (approximately several mW).

In contrast, in a feed antenna, it is general to apply high power (approximately several tens W) for feeding from one device to the other device.

Therefore, in the configuration described in Japanese Unexamined Patent Application Publication No. 2008-301183, when a ferrite material is not used with the intension of cost reduction and downsizing of the device, the inventors have found a problem that there is a high possibility of failing communication using a communication antenna by being affected by sending of higher power compared with the communication using a feed antenna. For example, there is a possibility that a situation, such as that sending of power becomes a noise to data communication and that data communication is not possible due to needless coupling of the communication antenna and the feed antenna, occurs. This affects, when carrying out two types of data communication where data communication is carried out using high power in one type, the other type of data communication.

In the case of using the camera device described in Japanese Unexamined Patent Application Publication No. 2008-301183 as, for example, a security camera, security problems arise when communication fails and transfer of imaging data fails.

The inventors have devised an approach that is capable of, in a device configured with two housings, data transfer by non-contact near-field wireless communication while sending power from one housing to the other housing by non-contact near-field wireless communication.

Descriptions are given below to an aspect of a proximity wireless communication device according to the present disclosure with reference to the drawings. In the present specification, the term "communication" may be used to include both transmission of information and transmission of power.

First Embodiment

[Configuration]

Figure 1A:
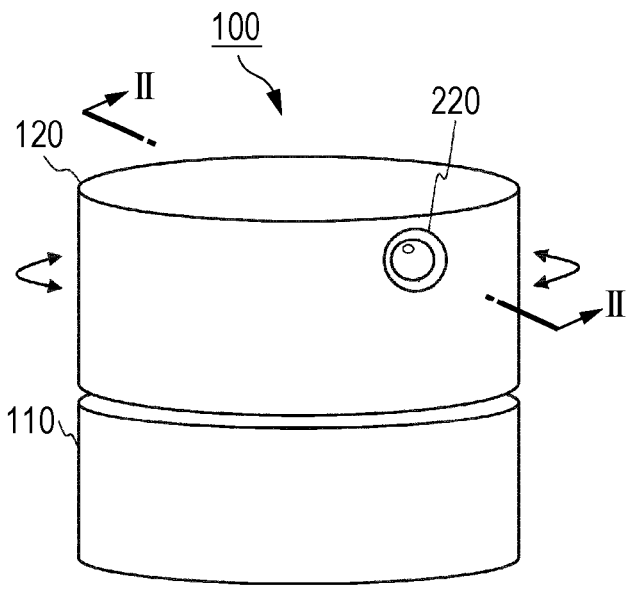
FIG. 1A is an external view of a proximity wireless communication device in a first embodiment.
Figure 1B:
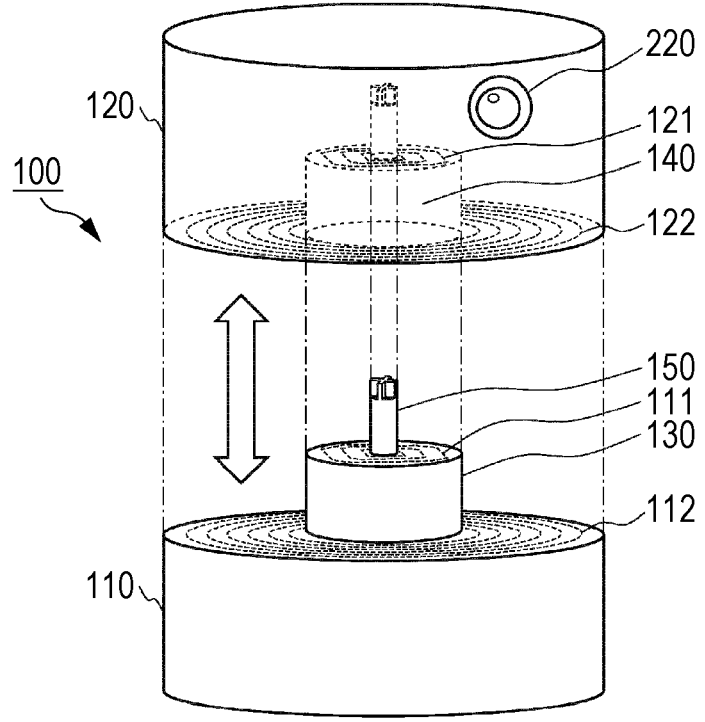
FIG. 1B is an exploded perspective view of the proximity wireless communication device in the first embodiment.

FIG. 1A is an external view of a proximity wireless communication device 100. FIG. 1B is an exploded perspective view of the proximity wireless communication device 100.

As illustrated in FIGS. 1A and 1B, the proximity wireless communication device 100 is provided with a first housing 110 and a second housing 120, and a column projection 130 of the first housing 110 and a column recess 140 of the second housing 120 fit. The second housing 120 is provided with a camera 220. It is possible to use the proximity wireless communication device 100 as a surveillance camera and the like by, for example, fixing a bottom surface of the first housing 110 to a ceiling of the facility and the like.

Although not shown in FIGS. 1A and 1B, a rotation shaft 150 of the first housing 110 is connected to a motor inside the first housing 110. The rotation shaft 150 fits and is adhered to the second housing 120. As the rotation shaft 150 rotates by driving the motor, the second housing 120 rotates relative to the first housing 110. In the proximity wireless communication device 100, the second housing 120 is configured to be capable of infinite rotation in any rotation direction of the rotation shaft 150 relative to the first housing 110. Accordingly, the proximity wireless communication device 100 is capable of imaging 360 degrees around.

Figure 2:
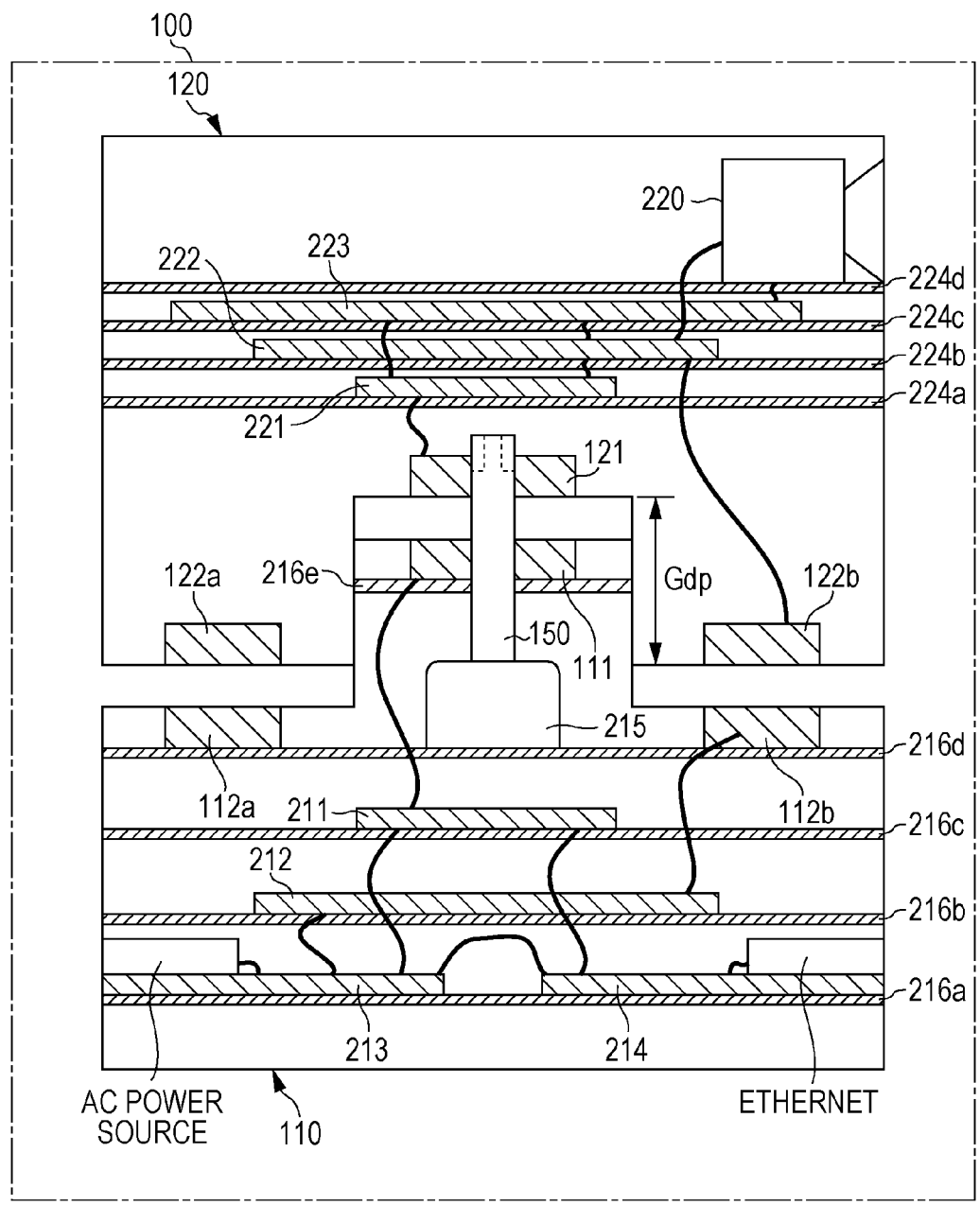
FIG. 2 is a cross-sectional view of the proximity wireless communication device according to the first embodiment.

FIG. 2 is a cross-sectional view of the proximity wireless communication device 100 in FIG. 1A taken at II-II line crossing the center of a circular top surface of the second housing 120.

As illustrated in FIG. 2, the first housing 110 has a multilayer board structure, and an AC power source, Ethernet®, a power source control unit 213, and a network unit 214 disposed on a first layer 216a thereof. A feeding unit 212 is disposed on a second layer 216b, a receiving unit 211 is disposed on a third layer 216c, a feed antenna 112 (112a and 112b in FIG. 2) is disposed on a fourth layer 216d, and a communication antenna 111 is disposed on a fifth layer 216e. Each component of the first housing 110 is connected in relationship of connection illustrated in FIG. 2. As illustrated in FIGS. 1B and 2, the communication antenna 111 and the feed antenna 112 are loop antennas centered at the rotation shaft 150.

The second housing 120 also has a multilayer board structure, and power receiving antennas 122a and 122b are disposed on a bottom surface (facing surface where the second housing 120 faces the first housing 110) of the second housing 120 and a communication antenna 121 is disposed on a bottom surface (dent portion) of the recess 140 at the bottom surface. A sending unit 221 is disposed on a first layer 224a of the second housing 120, a power receiving unit 222 is disposed on a second layer 224b, a camera control unit 223 is disposed on a third layer 224c, and the camera 220 is disposed on a fourth layer 224d. Each component of the second housing 120 is connected in relationship of connection illustrated in FIG. 2. As illustrated in FIGS. 1B and 2, the communication antenna 121 and the power receiving antenna 122 are loop antennas centered at the rotation shaft 150.

The column projection 130 of the first housing 110 has a height of Gdp (approximately 10 mm, here). The column recess 140 of the second housing 120 has a depth of Gdp. That is, in the first housing 110, the respective planes where the communication antenna 111 and the feed antenna 112 are disposed are apart by a predetermined distance Gdp in a direction of height in FIG. 2 (axial direction of the rotation shaft 150). Similarly, in the second housing 120, the respective planes where the communication antenna 121 and the power receiving antenna 122 are disposed are apart by the predetermined distance Gdp in a direction of height in FIG. 2 (axial direction of the rotation shaft 150).

Figure 4:
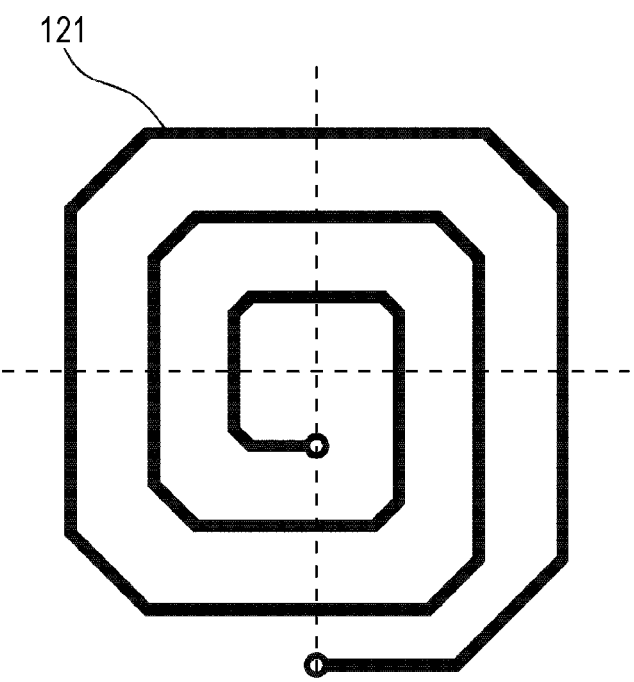
FIG. 4 is a diagram illustrating an example of a feed antenna.
Figure 5:
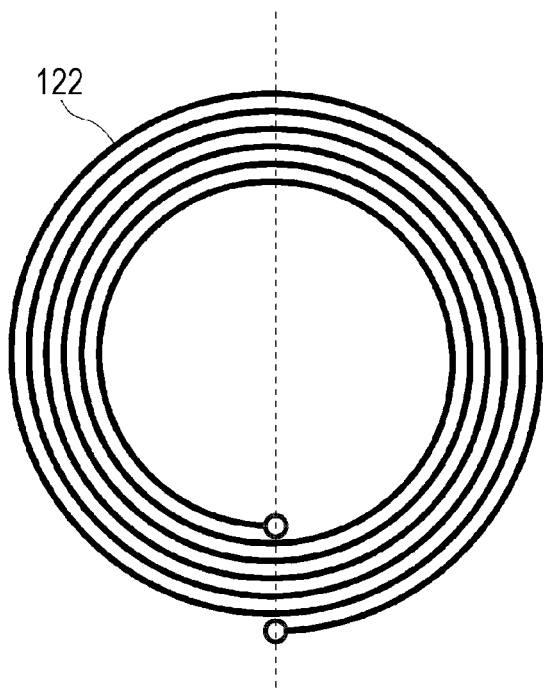
FIG. 5 is a functional block diagram of the proximity wireless communication device according to the first embodiment.

Here, descriptions are given to a shape and configuration example of the communication antennas 111 and 121 using FIG. 4 and a shape and configuration example of the feed antenna 112 and the power receiving antenna 122 using FIG. 5.

FIG. 4 is a diagram illustrating an example of a shape of the communication antennas 111 and 121. The communication antennas 111 and 121 here are antennas used for transmission of imaging data from the camera. A data volume of the imaging data from the camera is approximately 2 Gbps in the case of, for example, raw data of full HD (width 1920×height 1080×16 bits (YUV 420)×60 fps).

It is possible to use those having a same shape and a same number of turns for the communication antennas 111 and 121 on the sending side and the receiving side. In FIG. 4, coil antennas are illustrated as an example and the shape thereof is approximately 20 mm both in height and width and a shape of folding wiring having a foil width of 100 μm at the corners at 45 degrees each on the basis of a rectangular shape having a number of turns of 3 spaced at a certain interval is employed. Employment of such shape enables high speed communication by non-contact near-field wireless communication. It should be noted that, not only the octagonal rectangular shape as above, but also various shapes, such as circular, rectangular, and polygonal, may be employed for the antennas for communication, and the shape, the size, the foil width, the board material, and the like are determined in accordance with transmission rate, a communication distance, and the like to be used and by considering communication characteristics, so that they are not limited to the illustration.

FIG. 5 is a diagram illustrating an example of the shapes of the feed antenna 112 and the power receiving antenna 122 of the proximity wireless communication device 100 in the first embodiment.

The feed antenna 112 and the power receiving antenna 122 are antennas to send power from the first housing 110 to the second housing 120, and here, are used for sending and receiving operating power of each part including the camera 220 included in the second housing 120. Since power is generally sent and received at a relatively low frequency, it is general to use antennas having a larger diameter compared with a communication antenna of 1 Gbps or greater. Although FIG. 5 illustrates a coil antenna as an example and illustrates as being turned in a circular shape having an outer diameter of approximately 100 mm and an inner diameter of approximately 70 mm with a number of turns of 6, the shape and the size are determined in accordance with the frequency, the feed distance, the feed voltage, and the like to be used and by considering antenna characteristics, so that they are not limited to the illustration.

The communication antennas 111 and 121 illustrated in FIG. 4 and the feed antenna 112 and the power receiving antenna 122 illustrated in FIG. 5 are defined in respective dimensions, as seen from the dimensions described above, so as to house the communication antennas 111 and 121 inside the feed antenna 112 and the power receiving antenna 122 when viewed in plane from the top of the proximity wireless communication device 100. In other words, in the present embodiment, the outer diameter of the communication antennas 111 and 121 are shorter than the inner diameter of the feed antenna 112 and the power receiving antenna 122.

Hereinafter, descriptions are given to functional configuration of the proximity wireless communication device 100.

Figure 3:
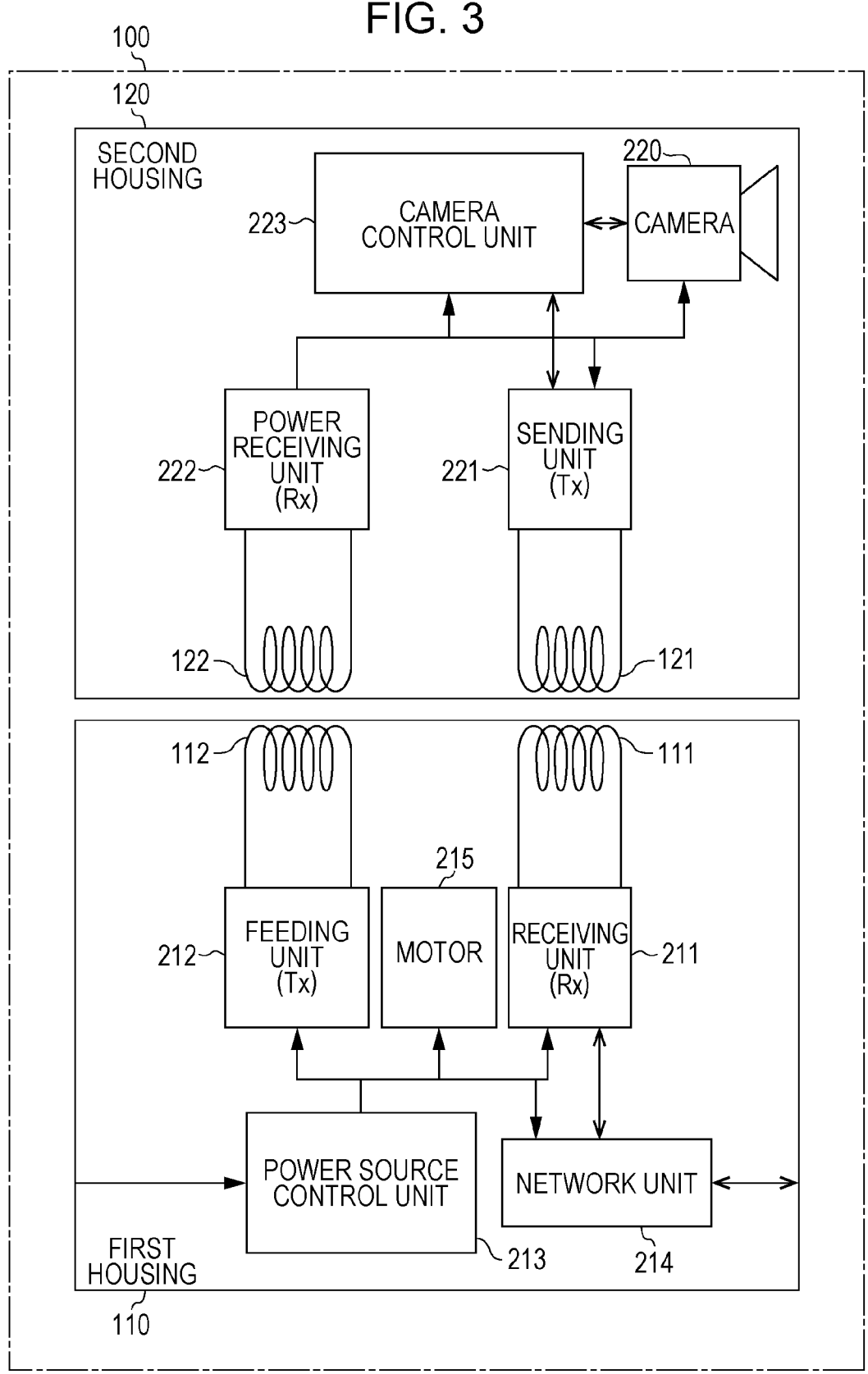
FIG. 3 is a diagram illustrating an example of a communication antenna.

FIG. 3 is a functional block diagram illustrating the functional configuration of the proximity wireless communication device 100.

As illustrated in FIG. 3, the first housing 110 of the proximity wireless communication device 100 is provided with the communication antenna 111, the feed antenna 112, the receiving unit 211, the feeding unit 212, the power source control unit 213, the network unit 214, and a motor 215.

The receiving unit 211 has a function of receiving imaging data that is taken by the camera 220 and sent from the second housing 120 via the communication antenna 111 and of notifying the network unit 214.

The feeding unit 212 has a function of receiving power supply from the power source control unit 213 and of carrying out power transmission control of power at several tens of W to the second housing 120 via the feed antenna 112. Power is transmitted from the feed antenna 112 to the power receiving antenna 122 by non-contact near-field wireless communication, and power transmission by an induced electromotive force may also be carried out as a type thereof.

The power source control unit 213 has a function of receiving an input of the power source and supplying the power source to each circuit of the first housing 110.

The network unit 214 is an interface to connect to an external network and has a function of sending imaging data of the camera 220 notified from the receiving unit 211 to the external network.

The motor 215 is configured to be capable of infinite rotation in any rotation direction of clockwise rotation and counter-clockwise rotation of the rotation shaft 150 illustrated in FIG. 1B and is driven following a routine defined in advance by a control unit, not shown. There are various methods of controlling the motor 215 in accordance with use of the proximity wireless communication device 100, and the details are omitted here. By driving the motor 215, the rotation shaft 150 rotates and, in conjunction with that, the second housing 120 rotates relative to the first housing 110. The rotation example of the rotation shaft 150 is merely an example and is not limited to this, and there are various configurations to rotate the rotation shaft 150, and for example, the rotation mechanism described in Japanese Unexamined Patent Application Publication No. 2008-301183 may also be utilized.

In contrast, as illustrated in FIG. 3, the second housing 120 of the proximity wireless communication device 100 is provided with the communication antenna 121, the power receiving antenna 122, the camera 220, the sending unit 221, the power receiving unit 222, and the camera control unit 223.

The camera 220 has a function of taking an image of a situation around the proximity wireless communication device 100, by control from the camera control unit 223, and notifying the sending unit 221 of the imaging data obtained by taking.

The sending unit 221 has a function of sending the imaging data notified from the camera 220 to the first housing 110 via the communication antenna 121 at power of approximately several mW.

The power receiving unit 222 has a function of receiving power sent from the first housing 110 via the power receiving antenna 122 and feeding the power to each part of the second housing 120. The power receiving unit 222 may also be provided with a secondary battery or a capacitor to accumulate the received power. When being provided with a secondary battery or a capacitor, it is possible to drive the second housing 120 to a certain extent even at a timing of not receiving power feeding.

The camera control unit 223 has a function of giving an instruction of start and end of taking an image and the like to the camera 220 to control the camera 220. This control may be sequentially instructed by a user and may also be carried out by a program routine defined in advance.

Figure 6:
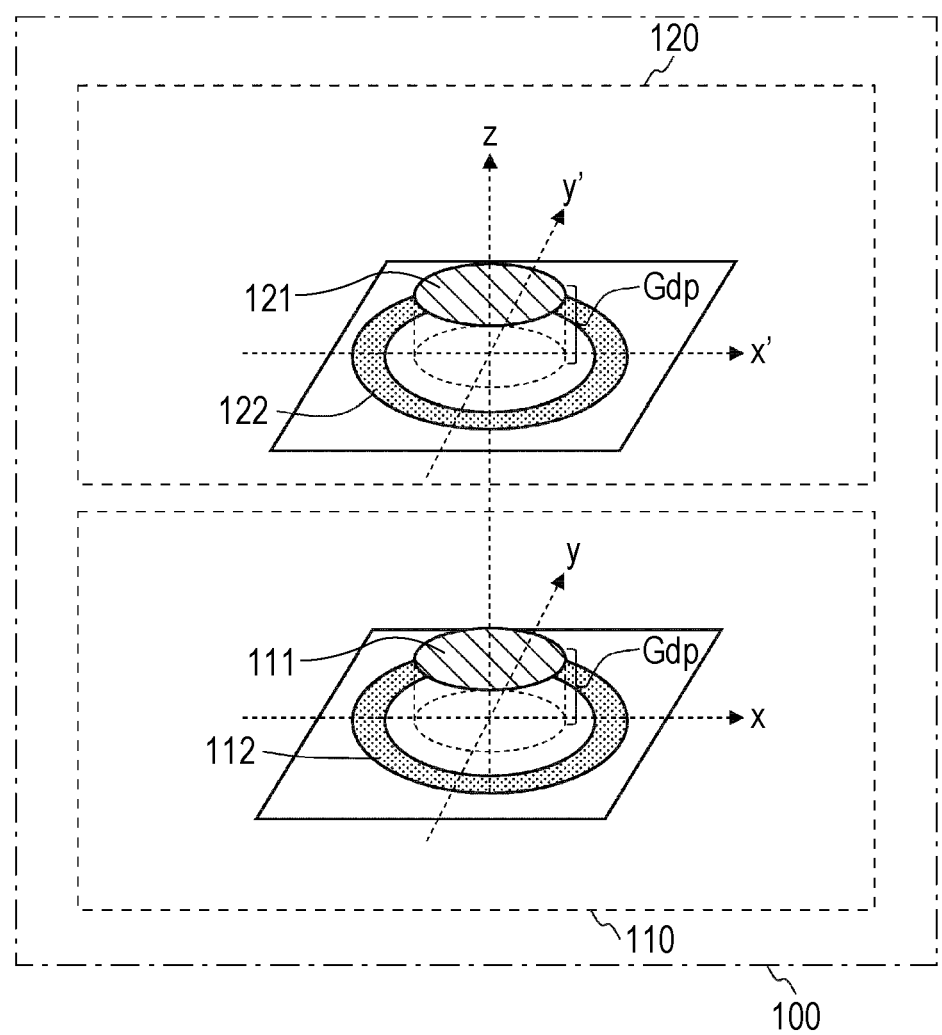
FIG. 6 is a conceptual diagram focusing on antenna arrangement in the proximity wireless communication device according to the first embodiment.

FIG. 6 is a conceptual diagram illustrating an idea on the antenna arrangement in the proximity wireless communication device 100 according to the present disclosure. The conceptual diagram illustrated in FIG. 6 is simplification of the configuration illustrated in FIGS. 1A, 1B, 2, and 3. In FIG. 6, different from the form illustrated in FIGS. 4 and 5, the antennas are illustrated by simplification.

As illustrated in FIG. 6, in the first housing 110, the communication antenna 111 and the feed antenna 112 are arranged apart by a predetermined distance Gdp.

Similarly, in the second housing 120, the communication antenna 121 and the power receiving antenna 122 are arranged apart by the predetermined distance Gdp.

As illustrated in FIGS. 1B and 2, the communication antenna 111 is present in proximity to the communication antenna 121 and in a position higher than the power receiving antenna 122 (position closer to the communication antenna 121 in the z axis direction).

In other words, a fitting surface of the pair of communication antennas and a fitting surface of the pair of feed antenna and power receiving antenna have a gap of the predetermined distance Gdp in the z axis direction. This enables suppression of occurrence of electrical coupling of the pair of communication antennas and the pair of feed antenna and power receiving antenna compared with the case where the communication antenna and the feed antenna are disposed on an identical plane, so that it is possible to carry out more stable communication by the communication antennas.

Therefore, compared with the case where the communication antenna and the feed antenna are disposed on an identical plane as in Japanese Unexamined Patent Application Publication No. 2008-301183, it is possible that each of the non-contact communication of the pair of communication antennas and of the pair of feed antenna and power receiving antenna does not affect the other non-contact communication. In particular, it is possible to reduce the influence of communication for feeding to carry out sending of high power to data communication carried out at low power. In other words, it is possible to suppress the possibility of electromagnetic field coupling of the pair of communication antennas with the pair of feed antenna and power receiving antenna more than the case where both pairs of antennas are disposed on an identical plane. Accordingly, without using an element to control the magnetic field, such as a ferrite material, it is possible to improve the accuracy of data communication between the first housing 110 and the second housing 120 while feeding.

<Operation>

Here, a brief description is given to operation of the proximity wireless communication device 100.

The feeding unit 212 that has received power supply from the power source control unit 213 of the proximity wireless communication device 100 sends power to the second housing 120 via the feed antenna 112 using non-contact near-field wireless communication.

The power receiving unit 222 of the second housing 120 receives the power via the power receiving antenna 122 and supplies the received power to each part of the second housing 120.

In contrast, the camera control unit 223 of the second housing 120 gives an instruction of taking an image to the camera 220 following an input from a user and a predetermined algorithm.

The camera 220 takes an image following an instruction from the camera control unit 223. Then, the imaging data obtained by taking is notified to the sending unit 221.

As receiving the imaging data from the camera 220, the sending unit 221 sends the raw data to the first housing 110 via the communication antenna 121 using non-contact near-field wireless communication. The raw data of imaging data is data not subjected to modulation and encoding and is so-called (digital) baseband data.

The receiving unit 211 receives the imaging data sent from the sending unit 221 via the communication antenna 111 by non-contact near-field wireless communication and notifies the network unit 214 of the received imaging data.

The network unit 214 encodes and modulates the received imaging data following a method defined in advance for sending to a connected external network. A device at the sending destination is defined in advance.

Although it is possible to perform feeding and data communication simultaneously in parallel, the sending unit 221 is not driven when feeding is not performed and power is not left in the capacitor and the like of the power receiving unit 222 so that data communication is not carried out.

Second Embodiment

In the present second embodiment, descriptions are given to a configuration that is capable of enhancing communication accuracy even more than the first embodiment.

While, in the first embodiment above, the communication accuracy of the communication antenna is enhanced by disposing the communication antenna and the feed antenna on planes different from each other, a configuration is described that is capable of suppressing influence of the non-contact communication between the communication antennas and between the feed antenna and the power receiving antenna to each other and enhancing communication accuracy by further efforts in addition to such configuration.

Specifically, a magnetic material is equipped at least between the communication antenna and the feed antenna. Although it is described to be possible to suppress degradation of communication even without providing a ferrite material in the first embodiment, a magnetic material may also be equipped as described in the present second embodiment when intending to improve accuracy of communication even more. The approach is described below.

Figure 7:
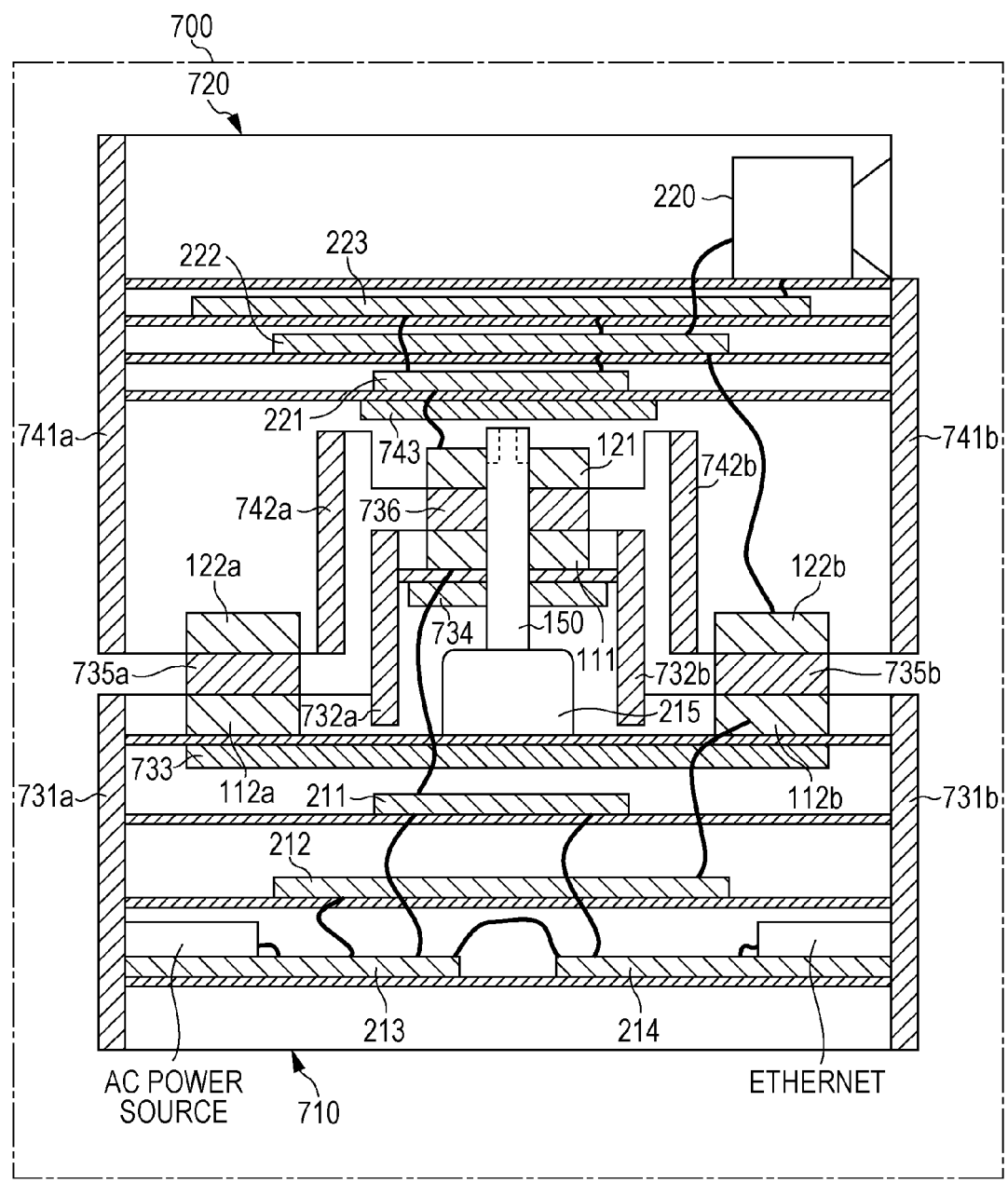
FIG. 7 is a cross-sectional view of a proximity wireless communication device according to a second embodiment.

FIG. 7 is a cross-sectional view of a proximity wireless communication device 700 according to the second embodiment.

Here, a same reference character is given to a configuration in common with the proximity wireless communication device 100 in the first embodiment and the descriptions are omitted to only describe different configuration.

The proximity wireless communication device 700 according to the second embodiment is provided with two housings similar to the first embodiment, that is, a first housing 710 and a second housing 720.

The first housing 710 and the second housing 720 are connected rotatably to each other via the rotation shaft 150 similar to the first housing 110 and the second housing 120.

The first housing 710 is further provided with magnetic materials 731 (731a and 731b), 732 (732a and 732b), 733, and 734 different from the first housing 110 described in the first embodiment.

The second housing 720 is also provided with magnetic materials 741 (741a and 741b), 742 (742a and 742b), and 743 different from the second housing 120 described in the first embodiment.

The magnetic materials 731, 732, 741, and 742 are formed in a cylindrical shape and the magnetic materials 733 and 743 are formed in a circular flat plate shape. The magnetic material 734 is formed in an annular shape.

These magnetic materials are disposed for the purpose of functioning as a lightning rod so to say in such a manner that one magnetic force of a magnetic field occurring between the antennas does not affect the other and also of reducing occurrence of eddy currents.

In addition, the proximity wireless communication device 700 is provided with an annular magnetic material 735 between the first housing 710 and the second housing 720 and also between the feed antenna 112 (112a and 112b) and the power receiving antenna 122 (122a and 122b) and is provided with an annular magnetic material 736 between the communication antenna 111 and the communication antenna 121. The magnetic materials 735 and 736 are adhered only to any one of the first housing 710 and the second housing 720, so that the second housing 720 is capable of rotating relative to the first housing 710.

On the contrary, by disposing the magnetic materials (735 and 736) across the pair of communication antennas or across the pair of feed antenna and power receiving antenna, it is also possible to easily generate a magnetic field there and to enhance the degree of coupling between the communication antennas 111-121 and the degree of coupling between the feed antenna 112 and the power receiving antenna 122.

Although the cross-sectional view in FIG. 7 illustrates a configuration where the housing protrudes a little from the recess of the second housing 720 towards the projection of the first housing 710, this is merely an illustration of an example of the configuration of the recess.

Third Embodiment

In the first and second embodiments above, configuration examples where two pairs of antennas (a pair of communication antennas and a pair of feed and power receiving antennas) are provided are described. However, the pairs of antennas to be provided in the proximity wireless communication device do not have to be limited to two pairs.

In the present third embodiment, a configuration example where a proximity wireless communication device is provided with three pairs of antennas is described.

Figure 8:
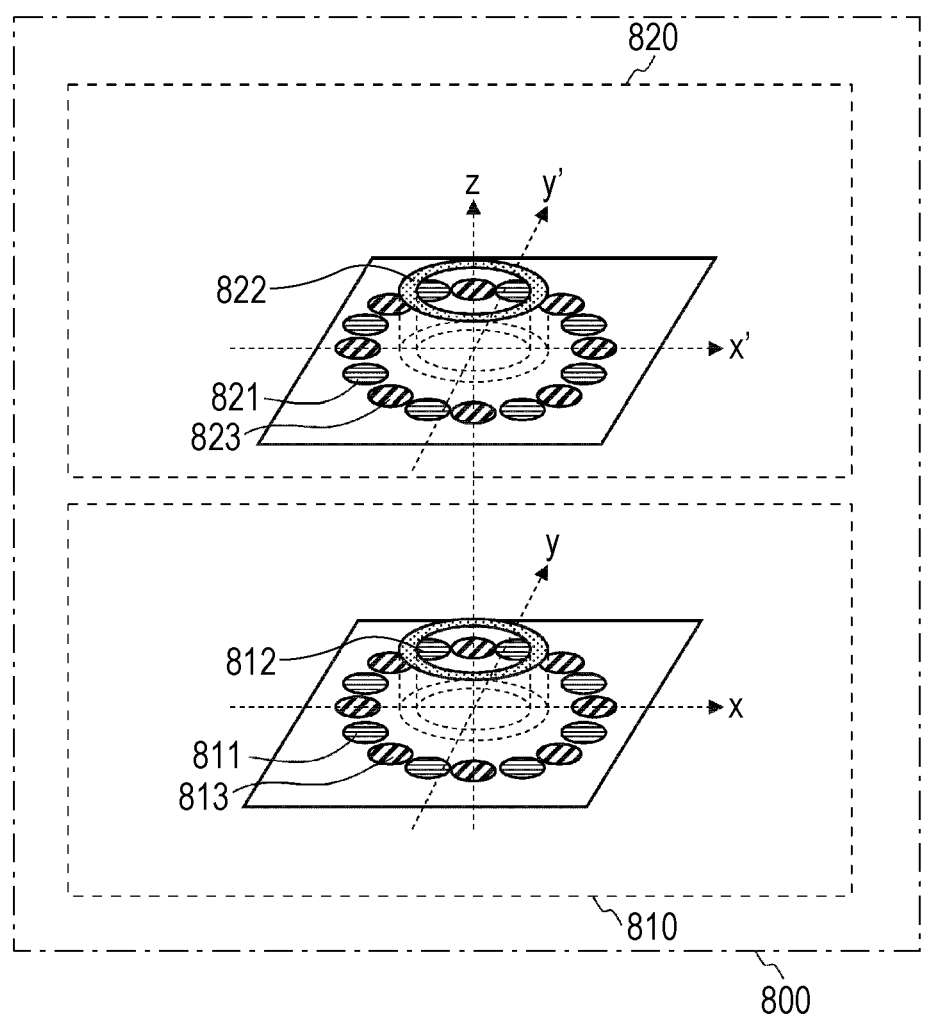
FIG. 8 is a conceptual diagram focusing on antenna arrangement in a proximity wireless communication device according to the third embodiment.
Figure 9:
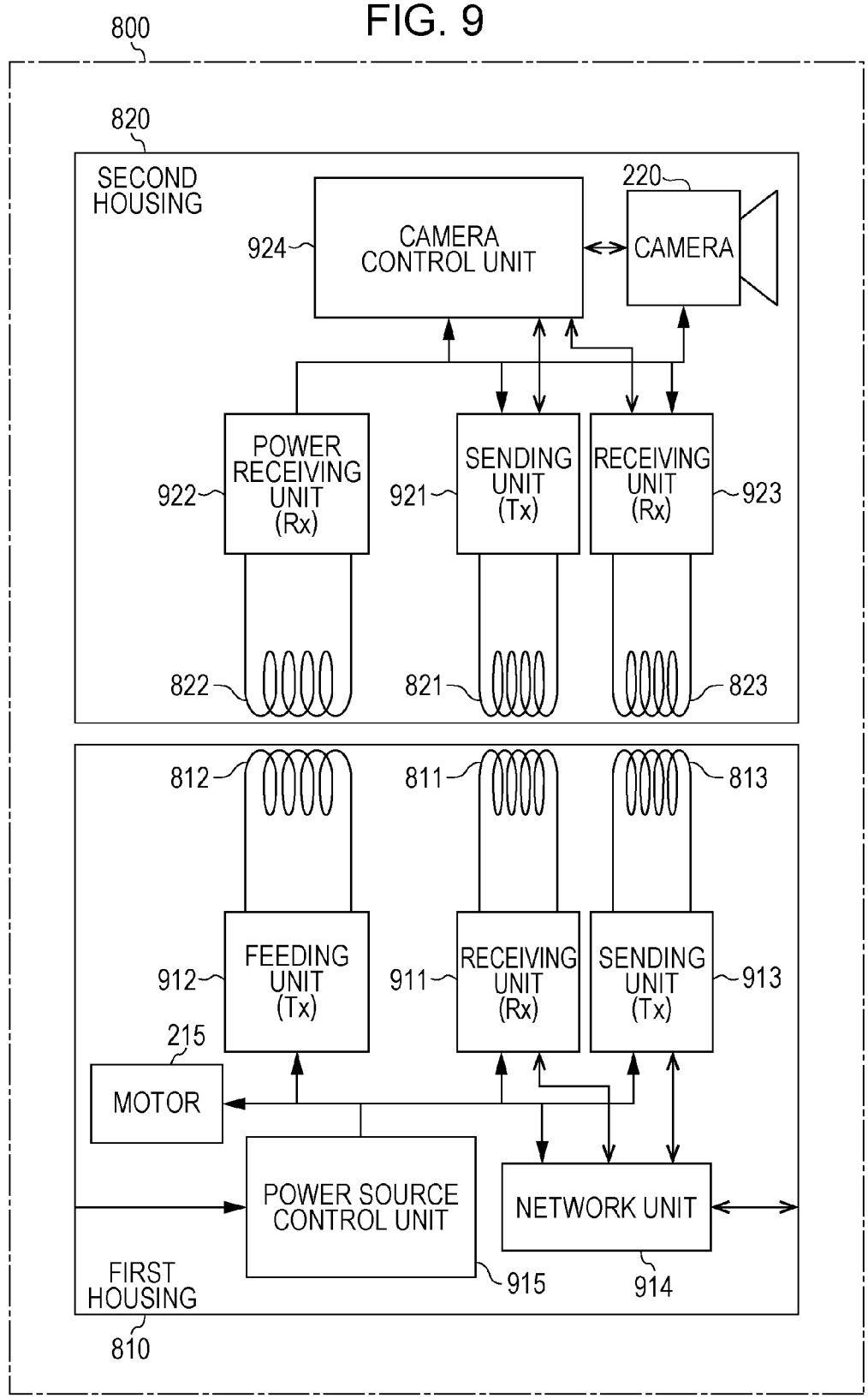
FIG. 9 is a cross-sectional view of the proximity wireless communication device according to the third embodiment.

FIG. 8 is a conceptual diagram illustrating an arrangement example of antenna arrangement in a proximity wireless communication device 800 according to the third embodiment, and FIG. 9 is a functional configuration diagram of the proximity wireless communication device 800.

Although the basic structure is similar to the proximity wireless communication device 100 described in the first embodiment, it is different in being provided with two types of communication antennas of a pair of antennas for sending from the first housing to the second housing and a pair of antennas for sending from the second housing to the first housing.

Descriptions are given below to the proximity wireless communication device according to the third embodiment with reference to FIGS. 8 and 9. The descriptions for functions in common with the first embodiment are omitted.
<Configuration>

In the proximity wireless communication device 800, similar to the first and second embodiments, a first housing 810 and a second housing 820 are connected rotatably.

FIG. 8 is a conceptual diagram of antenna arrangement in the proximity wireless communication device 800 according to the third embodiment.

As illustrated in FIG. 8, the first housing 810 is provided with a communication antenna 811, a feed antenna 812, and a communication antenna 813. In the present third embodiment, the feed antenna 812 is disposed in the position where the communication antenna 111 is disposed in the first embodiment above. Then, a plurality of communication antennas 811 and communication antennas 813 are disposed alternately in the position where the feed antenna 112 is disposed in the first embodiment above. Then, although not shown, a rotation shaft (the z axis in FIG. 8 is equivalent to the rotation shaft) passes through the center of the feed antenna 812 and the center of a circle made by the plurality of communication antennas 811 and 813. As illustrated in FIG. 8, similar to the first and second embodiments, a plane where the feed antenna 812 is disposed and a plane where the communication antennas 811 and 813 are disposed are apart by a predetermined distance Gdp. Although the communication antenna 811 and the communication antenna 813 are disposed adjacent on an identical plane, the power to be used for communication is approximately several mW in both and the influence to communication of each other is less. In FIG. 8, the circles hatched with horizontal lines are all communication antenna 811 and the circles hatched with rightward oblique lines are all communication antenna 813.

The second housing 820 is provided with a communication antenna 821, a power receiving antenna 822, and a communication antenna 823. In the present third embodiment, the power receiving antenna 822 is disposed in the position where the communication antenna 121 is disposed in the first embodiment above. Then, a plurality of communication antenna 821 and communication antenna 823 are disposed alternately in the position where the power receiving antenna 122 is disposed in the first embodiment above. Then, although not shown, a rotation shaft (z axis in FIG. 8 is equivalent to the rotation shaft) passes through the center of the power receiving antenna 822 and the center of a circle made by the plurality of communication antennas 821 and 823. As illustrated in FIG. 8, similar to the first and second embodiments, a plane where the power receiving antenna 822 is disposed and a plane where the communication antennas 821 and 823 are disposed are apart by the predetermined distance Gdp. Although the communication antenna 821 and the communication antenna 823 are disposed adjacent on an identical plane, power to be used for communication is approximately several mW in both and influence to communication of each other is less. In FIG. 8, the circles hatched with horizontal lines are all communication antenna 821 and the circles hatched with rightward oblique lines are all communication antenna 823.

As seen from comparison with FIG. 6 of the first embodiment, the proximity wireless communication device 100 has a configuration to be provided with one type of communication antenna whereas the proximity wireless communication device 800 is provided with two types of communication antennas and a configuration is employed in which a plurality of communication antennas having an antenna diameter smaller than that of a feed antenna are disposed around the feed antenna from the relationship of the frequency used for communication and the frequency used for feeding.

It is required that the communication antenna 811 and the communication antenna 821 in FIG. 8 face each other and the communication antenna 813 and the communication antenna 823 face each other. Therefore, the motor 215 is controlled so as to rotate the rotation shaft in the proximity wireless communication device 800 by an angle twice an interior angle made by a line connecting a center of the communication antenna 811 and a center of a circle formed by the communication antennas 811 and 813 and a line connecting a center of the communication antenna 813 and a center of a circle formed by the communication antennas 811 and 813 as an angle of rotation.

FIG. 9 is a functional block diagram illustrating functional configuration of the proximity wireless communication device 800. Here, a same reference character is given to a functional component functioning equivalent to the proximity wireless communication device 100 illustrated in FIGS. 1A and 1B and the descriptions are omitted.

As illustrated in FIG. 9, the first housing 810 is provided with the motor 215, the communication antenna 811, the feed antenna 812, the communication antenna 813, a receiving unit 911, a feeding unit 912, a sending unit 913, a network unit 914, and a power source control unit 915.

The receiving unit 911 has a function of receiving imaging data taken by the camera 220 sent from the second housing 820 via the communication antenna 811 and notifying the network unit 914.

The feeding unit 912 has a function of receiving power supply from the power source control unit 915 and carrying out power transmission control of power of several tens of W to the second housing 820 via the feed antenna 812. From the feed antenna 812 to the power receiving antenna 822, power is transmitted by non-contact near-field wireless communication, and power transmission by an induced electromotive force may also be carried out as a type thereof.

The network unit 914 is an interface to be connected to an external network and has a function of sending imaging data of the camera 220 notified from the receiving unit 911 to the external network. The network unit 914 also has a function of notifying the sending unit 913 of control information of the camera 220 obtained from outside.

The power source control unit 915 has a function of receiving an input of the power source and supplying the power source to each circuit of the first housing 810.

In contrast, as illustrated in FIG. 9, the second housing 820 of the proximity wireless communication device 800 is provided with the camera 220, the communication antenna 821, the power receiving antenna 822, the communication antenna 823, a sending unit 921, a power receiving unit 922, a receiving unit 923, and a camera control unit 924.

The sending unit 921 has a function of sending imaging data notified from the camera 220 to the first housing 810 at power of approximately several mW via the communication antenna 821.

The power receiving unit 922 has a function of receiving the power sent from the first housing 810 via the power receiving antenna 822 and feeding the power to each part of the second housing 820. The power receiving unit 922 may also be provided with a secondary battery or a capacitor to accumulate the received power. When being provided with a secondary battery or a capacitor, it is possible to drive the second housing 820 to a certain extent even at a timing of not receiving power feeding.

The receiving unit 923 has a function of receiving control information of the camera 220 sent from the first housing 810 via the communication antenna 823 and notifying the camera control unit 924.

The camera control unit 924 has a function of giving an instruction of start and end of taking an image and the like to the camera 220 based on the control information received from the receiving unit 923 and controlling the camera 220.

<Operation>

In addition to the feeding operation carried out by the proximity wireless communication device 100 according to the first embodiment and the communication operation to send imaging data from the second housing to the first housing, the proximity wireless communication device 800 according to the third embodiment carries out the following process.

The network unit 914 of the first housing 810 receives control information to control the camera 220 from an external network and notifies the sending unit 913.

The sending unit 913 of the first housing 810 sends the notified control information via the communication antenna 813 to the second housing 820 by non-contact near-field wireless communication.

The receiving unit 923 of the second housing 820 sends the control information to control the camera 220 sent from the sending unit 913 via the communication antenna 813.

The receiving unit 923 of the second housing 820 notifies the camera control unit 924 of the received control information.

The camera control unit 924 controls the camera 220 based on the notified control information. The imaging data taken by the camera 220 is sent from the sending unit 921 to the second housing 820 similar to the first embodiment above.

In such a manner, the proximity wireless communication device 800 according to the third embodiment is capable of carrying out three types of communication that are sending of imaging data from the sending unit 921 to the receiving unit 911, communication for feeding from the feeding unit 912 to the power receiving unit 922, and sending of control information from the sending unit 913 to the receiving unit 923, simultaneously in parallel. In the proximity wireless communication device 800, the communication antenna and the feed antenna (power receiving antenna) are apart by the predetermined distance Gdp, so that it is possible to suppress influence of communication for feeding to data communication as much as possible.

[Modifications]

Although the descriptions have been given to the proximity wireless communication device according to the present disclosure in accordance with the above embodiments, the present disclosure is not limited to them. Descriptions are given below to various modifications included as an idea of the present disclosure.

(1) Although the second housing 120 has a configuration to be provided with the motor 215 in the above embodiments, the motor 215 may also be provided in the first housing 110 as long as the first housing 110 is configured to be rotatable relative to the second housing 120.

In addition, although it is described that the motor 215 is equipped so as to rotate the first housing 110 and the second housing 120, they may also be rotated manually. In this case, it is possible to eliminate the rotation shaft 150 and the motor 215.

In addition, the situation of fitting varies, not rotation, in accordance with the shapes of the projection 130 and the recess 140 and the situation of the shape of the proximity wireless communication device 100 may also vary. For example, the configuration may also have the projection 130 in a hexagonal prism shape and the recess 140 as a dent in a hexagonal prism shape to fit the projection 130. Then, the first housing 110 and the second housing 120 may also be attached and detached by a hand of a user to fit the projection 130 in a hexagonal prism shape and the recess 140 in a hexagonal prism shape in the form desired by the user.

Although an example of providing the projection and the recess at the respective center of the first housing and the second housing is described in the embodiments above, it is not limited to this and the projection and the recess may also be provided closer to an end portion of the respective facing surfaces of the first housing and the second housing as long as it is possible to maintain the relationship of antenna arrangement around the projection and the recess described in the above embodiments. The first housing and the second housing may also be stepwise, respectively.

(2) In the above embodiments, as an example of the proximity wireless communication device 100, those sending and receiving image data obtained by the camera 220 by non-contact near-field wireless communication using the communication antennas and sending and receiving power by non-contact near-field wireless communication using feed and power receiving antennas are described.

However, the proximity wireless communication device 100 is not limited to this, and it may be in any form as long as data communication and feeding are carried out by non-contact near-field wireless communication with two antennas and the antennas used for the respective communication are configured not to be disposed on an identical plane.

(3) Although the examples where the rotation shaft 150 is positioned at the center of the first housing 110 and the second housing 120 are disclosed in the above embodiments, it is not limited to that. The rotation area may be in any area in accordance with the use and the design idea of the proximity wireless communication device 100 as long as the arrangement relationship of the feed antenna and the communication antenna are in the positional relationship as illustrated in FIG. 6 or FIG. 8.

(4) Although the communication antenna is configured to be inside the feed antenna (power receiving antenna) in the first embodiment above, it is not limited to that and the arrangement may also be opposite.

In the first embodiment above, it is described that the antenna diameter varies in accordance with the frequency to be used. Therefore, it is possible that the diameter of the communication antenna exceeds the diameter of the feed antenna (power receiving antenna) depending on the frequencies to be used by the communication antenna and the feed antenna.

(5) In the above embodiments, regarding the distance Gdp in the axial direction of the rotation shaft 150 between the communication antenna and the feed antenna, an amount of electromagnetic field radiation in each position from the feed antenna is firstly calculated in simulation to estimate a provisional distance Gdp within the range of the signal to noise (S/N) ratio of the specification of the receiving IC for communication. After that, a proximity wireless communication device 100 equivalent to an actual machine is fabricated to measure the actual S/N ratio in the communication antenna. Then, the provisional distance Gdp is adjusted while confirming whether the S/N ratio is within the acceptable specification of the receiving IC, thereby determining the actual distance Gdp.

However, this is merely one approach for Gdp determination, and other approaches may also be employed.

For example, when the coupling between the feed antenna and the communication antenna is caused by the magnetic field, expansion of the magnetic field distributed in the vicinity of the coil depends on the coil diameter. When a smaller value is defined as Ds out of a diameter Dp of the feed antenna and a diameter Dd of the communication antenna, there is also a method of determining the above predetermined distance Gdp to be one tenth or greater of Ds.

In contrast, when the coupling of the feed antenna and the communication antenna is caused by the electric field, a strong electric field distributed in the vicinity of the coil depends on the interval width between the wiring forming the coil, so that when a smaller value is defined as Ss out of a minimum value Sp of the wiring interval width in the feed antenna and a minimum value Sd of the wiring interval in the communication antenna, there is also a method of determining the predetermined distance Gdp to be one tenth or greater of Ss.

Although methods of determining the predetermined offset Gdp in length are described in such a manner, it is not required to take such method and it may also be another method, such as to determine the predetermined distance Gdp by a ratio of power in the feed antenna and the communication antenna. For example, sending and receiving at various intensities of power by the feed antenna and the communication antenna are performed, a preferred predetermined distance Gdp in each case is estimated by simulation, and a table to define the preferred predetermined distance Gdp for each power ratio is created. Then, the predetermined distance Gdp may also be estimated using the table from the power ratio of the respective power actually used by the feed antenna and the communication antenna.

(6) In the second embodiment above, a configuration where the two types of communication antennas and the feed antenna are arranged on different planes is disclosed. Although a configuration where the two types of communication antennas are arranged on an identical plane is described in the configuration, it is not limited to that. Similar to the relationship of the communication antenna and the feed antenna, the two types of communication antennas may also be configured to be arranged on different planes.

That is, in the first housing 810 of the third embodiment, the communication antenna 811 and the communication antenna 813 may also be configured to be disposed on different circumferences and also a level difference to be created between the communication antenna 811 and the communication antenna 813. Similarly in the second housing 820, the communication antenna 821 and the communication antenna 823 may also be configured to be disposed on different circumferences and also a level difference to be created between the communication antenna 821 and the communication antenna 823. Then, it may be fine as long as the communication antenna 811 and the communication antenna 821 are configured to face and the communication antenna 813 and the communication antenna 823 to face.

(7) Although not specified in particular in the above embodiments, in sending and receiving of imaging data, raw data is assumed to be sent and received without encoding, modulation, and the like, it is not limited to that. The imaging data may also be sent and received after being subjected to process, such as encoding and modulation.

(8) In the above embodiments, the arrangement examples of each functional component illustrated in the cross-sectional views of FIGS. 2 and 7 are examples and they are not limited to those.

In the proximity wireless communication device, as long as the configuration satisfies four conditions of:

(i) that the distance in the rotation shaft direction of the communication antenna and the feed antenna in the first housing 110 is apart by Gdp;

(ii) that the distance in the rotation shaft direction of the communication antenna and the feed antenna in the second housing 120 is apart by Gdp;

(iii) that the communication antenna 111 of the first housing 110 and the communication antenna 121 of the second housing 120 couple with each other in proximity to the extent being capable of communication; and (iv) that the feed antenna 112 of the first housing 110 and the power receiving antenna 122 of the second housing 120 are in proximity to the extent being capable of feeding, other configurations may be in any arrangement. At this time, the parts arrangement preferably does not hinder the rotation in the proximity wireless communication device.

(9) In the second embodiment above, an example of disposing the magnetic materials in the proximity wireless communication device is described. Here, although the magnetic materials are described as in a cylindrical shape and a disc shape, the magnetic materials are not limited to them.

These magnetic materials may be in any shape as long as it is possible to induce a produced magnetic field. For example, in the second embodiment, the magnetic materials between the communication antennas may also be in a square shape, not a disc shape. Alternatively, in the second embodiment, the magnetic materials between the feed antenna and the power receiving antenna may also be in a square shape, not a donut shape, disposed in plurality on a circumference along the feed antenna.

The magnetic materials in a cylindrical shape may also be in an arc plate shape, not a cylindrical shape, disposed in plurality. Alternatively, magnetic materials in a simple plate shape may also be disposed on a circumference, and magnetic materials in prism shape, not a cylindrical shape, may also be used.

Figure 10A:
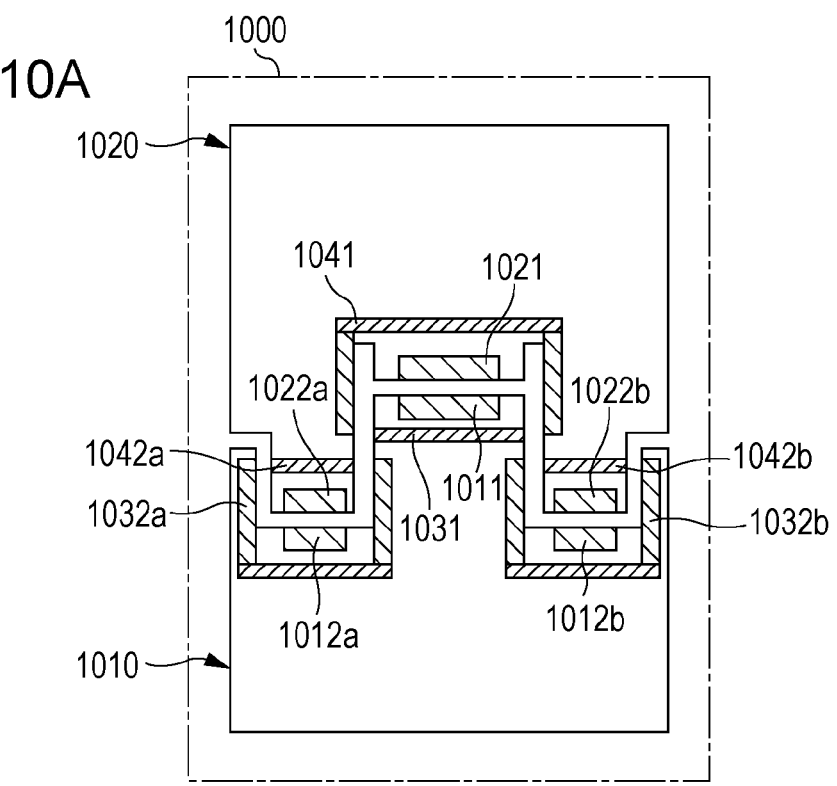
FIGS. 10A and 10B are diagrams illustrating another example of shapes of a first housing and a second housing and an arrangement example of magnetic materials.
Figure 10B:
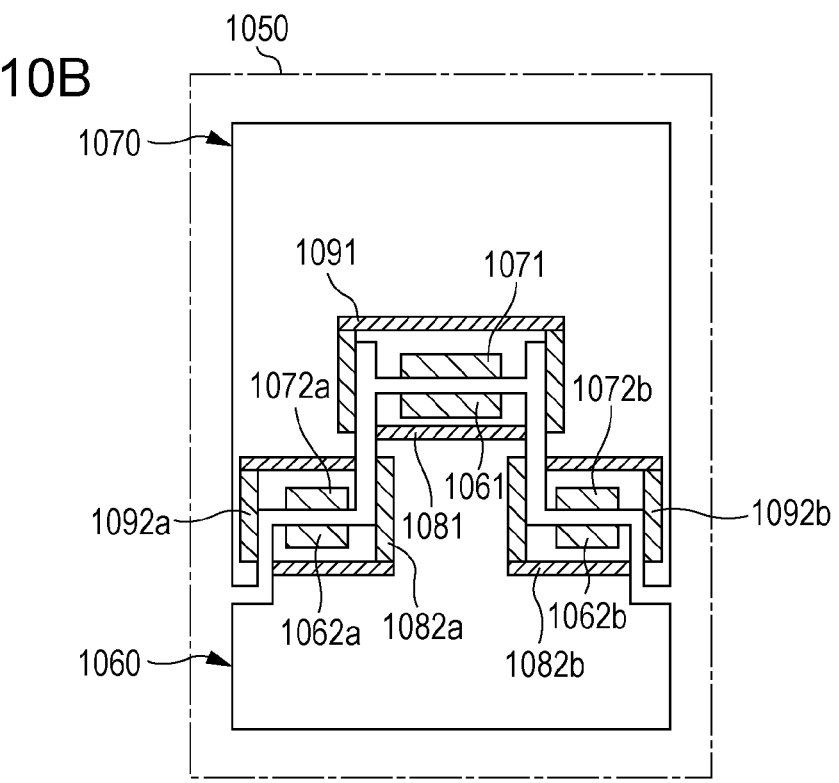

The magnetic materials may also be arranged as illustrated in, for example, FIGS. 10A and 10B. FIGS. 10A and 10B are cross-sectional views of the proximity wireless communication device only illustrating the arrangement of antennas and magnetic materials.

A proximity wireless communication device 1000 illustrated in FIG. 10A has a first housing 1010 and a second housing 1020 that fit each other.

The first housing 1010 is provided with a communication antenna 1011, a feed antenna 1012*a* and 1012*b*, and magnetic materials 1031, 1032*a*, and 1032*b*.

The second housing 1010 is provided with a communication antenna 1021, a power receiving antenna 1022*a* and 1022*b*, and magnetic materials 1041, 1042*a*, and 1042*b*.

A projection of the first housing 1010 and a recess of the second housing 1020 have a shape illustrated in FIG. 10A.

In a situation where the first housing 1010 and the second housing 1020 fit, the communication antenna 1011 and the communication antenna 1021 are configured to face, and the feed antenna 1012*a* and the power receiving antenna 1022*a* and also the feed antenna 1012*b* and the power receiving antenna 1022*b* are configured to face.

Then, it is configured to surround the pair of communication antennas 1011-1021 by the magnetic material 1031 and the magnetic material 1041. Similarly, it is configured to surround the pair of feed antenna and power receiving antenna 1012*a*-1022*a* by the magnetic material 1032*a* and the magnetic material 1042*a*, and configured to surround the pair of feed antenna and power receiving antenna 1012*b*-1022*b* by the magnetic material 1032*b* and the magnetic material 1042*b*.

Other configurations are omitted as they are in accordance with the first and third embodiments.

A proximity wireless communication device 1050 illustrated in FIG. 10B has a first housing 1060 and a second housing 1070 that fit each other.

The first housing 1060 is provided with a communication antenna 1061, a feed antenna 1062*a* and 1062*b*, and magnetic materials 1081, 1082*a*, and 1082*b*.

The second housing 1070 is provided with a communication antenna 1071, a power receiving antenna 1072*a* and 1072*b*, and magnetic materials 1091, 1092*a*, and 1092*b*.

A projection of the first housing 1060 and a recess of the second housing 1070 have a shape illustrated in FIG. 10B.

In a situation where the first housing 1060 and the second housing 1070 fit, the communication antenna 1061 and the communication antenna 1071 are configured to face, and the feed antenna 1062*a* and the power receiving antenna 1072*a*, and the feed antenna 1062*b* and the power receiving antenna 1072*b* are configured to face.

Then, the pair of communication antennas 1061-1071 is configured to be surrounded by the magnetic material 1081 and the magnetic material 1091. Similarly, the pair of feed antenna and power receiving antenna 1062*a*-1072*a* is configured to be surrounded by the magnetic material 1082*a* and the magnetic material 1092*a*, and the pair of feed antenna and power receiving antenna 1062*b*-1072*b* is configured to be surrounded by the magnetic material 1082*b* and the magnetic material 1092*b*.

Other configurations are omitted as they are in accordance with the first and third embodiments.

As illustrated in FIGS. 10A and 10B, even when the shapes of the projection and the recess are different, it is possible to reduce needless coupling of the feed antenna and the communication antenna and achieve both more stable power transmission and data communication by providing a level difference between the pair of feed antenna and power receiving antenna and the pair of communication antennas in accordance with the shape and arranging the magnetic materials to surround each pair of antennas.

(10) Although the communication antennas, the feed antenna, and the power receiving antenna are assumed to be made with a copper foil in the above embodiments, they are not limited to that. Other antennas may also be used as long as it is possible to perform non-contact wireless communication between the first housing and the second housing.

Figure 11:
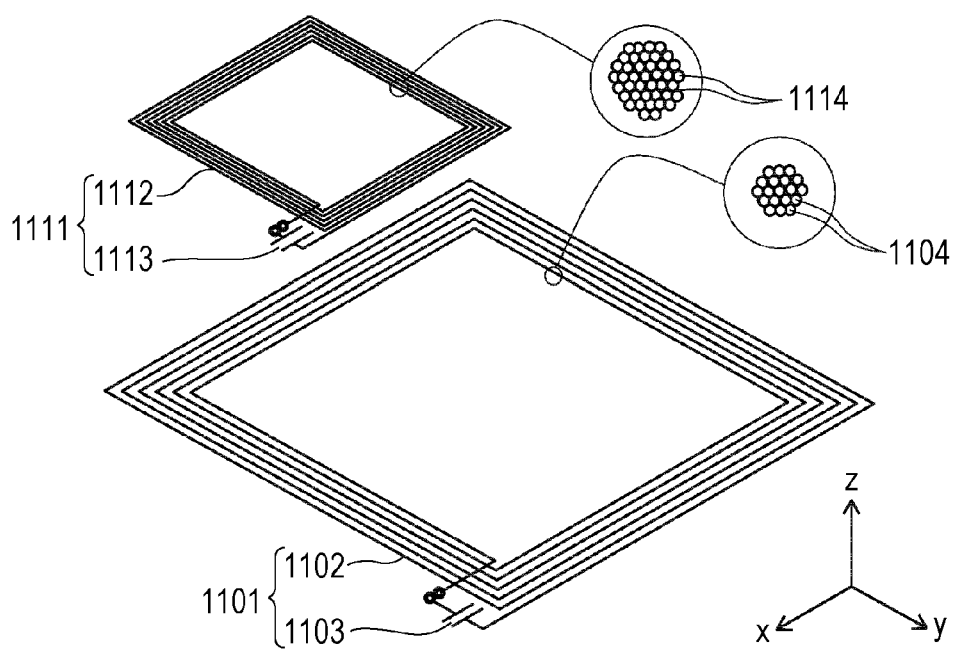
FIG. 11 is a diagram illustrating another example of a feed antenna and a power receiving antenna.

For example, as illustrated in FIG. 11, a feed antenna 1001 and a power receiving antenna 1111 may also be configured with a series LC circuit.

Although the feed antenna 1101 is configured with a coil portion 1102 and a resonance condenser 1103 and the coil is illustrated to have a number of turns of 6, it may also be configured by bundling wiring 1104.

Similarly, although the power receiving antenna 1111 is configured with a coil portion 1112 and a resonance condenser 1113 and the coil is illustrated to have a number of turns of 6, it may also be configured by bundling wiring 1114. Although a series LC circuit is illustrated here, it may also be a parallel LC circuit. The size of the coil 1102 in the feed antenna is approximately 100 mm×100 mm and the size of the coil 1112 in the power receiving antenna is approximately 80 mm×80 mm and smaller than the coil of the feed antenna, which is different from the case described in the above embodiments, and it is possible to adjust the size difference in the feed antenna and the power receiving antenna by the size and the wire material of the coil, the capacitance of the condenser, and the like depending on the frequency to be used. Therefore, there is freedom to a certain extent in the arrangement and the size of the feed antenna and the power receiving antenna in the proximity wireless communication device, so that designing of the proximity wireless communication device is facilitated.

(11) Although not described in particular in the above embodiments, descriptions are given here to antenna characteristics of the communication antenna and the feed antenna.

Figure 12A:
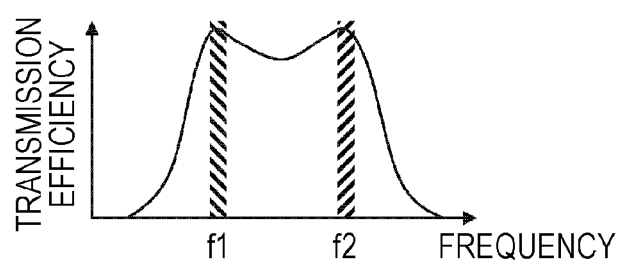
FIG. 12A is a conceptual diagram regarding resonant frequency.
Figure 12B:
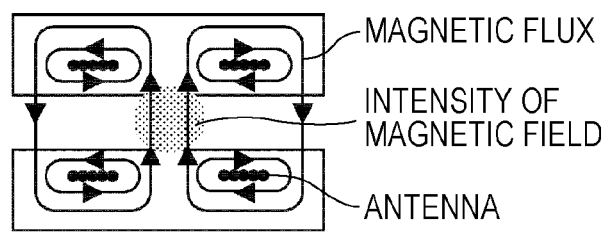
FIG. 12B is a conceptual diagram of a transmission mode.
Figure 12C:
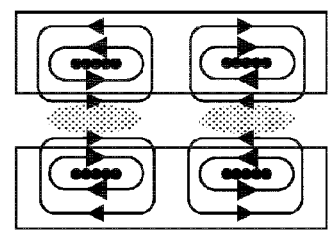
FIG. 12C is a conceptual diagram of a transmission mode.

FIG. 12A illustrates transmission efficiency for each frequency in the present embodiment. When the transmission efficiency is investigated by changing the frequency to be used in the antennas, relatively good efficiency characteristics may be obtained at two frequencies f1 and f2. When a lower frequency among them is called as odd mode transmission and a higher frequency is called as even mode transmission, magnetic fields are produced in the respective modes as in FIGS. 12B and 12C.

Whereas the intensity of the magnetic field becomes strong at a central position of the antenna in the odd mode transmission, the intensity of the magnetic field becomes strong at fitting areas of the antennas in the even mode transmission, so that in the feed antenna of the present embodiment, using the even mode transmission makes the electromagnetic field coupling relative to the communication antenna weaker and reduces the influence of a noise in the communication antenna, and facilitates coexisting of the feed antenna and the communication antenna.

Figure 13A:
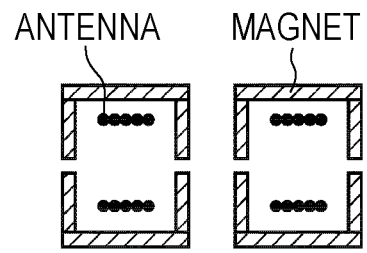
FIG. 13A is a diagram illustrating another example regarding arrangement of antennas and magnetic materials.
Figure 13B:
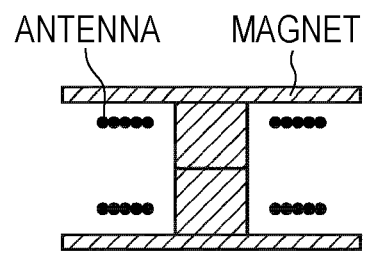
FIG. 13B is a diagram illustrating another example regarding arrangement of antennas and magnetic materials.
Figure 13C:
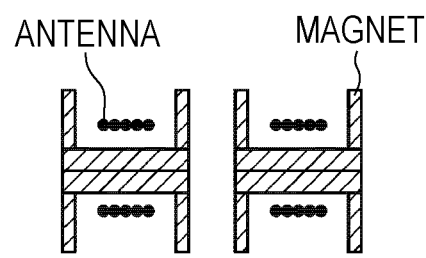
FIG. 13C is a diagram illustrating another example regarding arrangement of antennas and magnetic materials.

Descriptions are given to a case where an effect of facilitating coexisting of the feed antenna and the communication antenna is obtained regarding the arrangement of the magnetic materials in the even mode transmission and the odd mode transmission using FIGS. 13A to 13C.

FIGS. 13A to 13C illustrate an example of a method of arranging the magnetic materials around the antennas. FIG. 13A is considered to be highly effective both in the odd mode transmission and the even mode transmission while FIG. 13B is considered to be effective in the odd mode transmission and FIG. 13C is considered to be effective in the even mode transmission.

The antennas in FIGS. 13A, 13B, and 13C may be any of the pair of feed antenna and power receiving antenna and the pair of communication antennas, and both pairs are not illustrated here considering the visibility of the drawings.

(12) Although the proximity wireless communication devices configured with the first housing and the second housing are disclosed in the above embodiments, the first housing and the second housing do not have to be in a closed structure as a housing and may also be a mounting unit in a disc shape and a rotation unit in a facing lid shape that face as in Japanese Unexamined Patent Application Publication No. 2008-301183 as long as the structure of creating a level difference between the communication antenna and the feed antenna (power receiving antenna) (structure of being apart by a predetermined distance Gdp) is achieved.

(13) The antennas illustrated in FIGS. 4 and 5 may be achieved by wiring formed on a printed board and by using a litz wire that is a bundle of a plurality of insulated strands. The wiring surface may also be covered selectively with a conductor having high conductivity, and similarly the wiring surface may also be plated with a magnetic material, thereby improving the characteristics. In particular, the antenna wiring used for supply and reception of the power source may be formed by being laminated as a plurality of layers in the z axis direction. In this case, it is possible to obtain the effects of the present disclosure by shifting the communication antenna 111 by a predetermined length in the axial direction of the above predetermined rotation shaft relative to a surface of the power receiving antenna 122 in most proximity centered at the predetermined rotation shaft. Similarly, regarding the communication antenna 121, it is also possible to obtain the effects of the present disclosure by shifting by a predetermined length relative to a surface of the feed antenna 112.

<Supplementation>

Hereinafter, embodiments and their effects of a proximity wireless communication device according to the present disclosure are described.

(A) A proximity wireless communication device according to the present disclosure is a proximity wireless communication device including: a first communication block and a second communication block, in which the first communication block has a first surface and a projection equipped in a part of the first surface, and a first antenna is disposed on an upper surface of the projection and a second antenna is disposed on the first surface, the second communication block has a second surface and a recess equipped in a part of the second surface, and a third antenna is disposed on a bottom surface of the recess and a fourth antenna is disposed on the second surface, the first surface and the second surface face in proximity, the projection and the recess fit, and the upper surface of the projection and the bottom surface of the recess face in proximity, and non-contact near-field wireless communication is carried out between the first antenna and the third antenna and between the second antenna and the fourth antenna.

According to the above configuration, it is possible to separate the first antenna and the second antenna to a certain extent. Similarly, it is also possible to separate between the third antenna and the fourth antenna to a certain extent.

Accordingly, it is possible to space a certain distance between the magnetic field produced by coupling of the first antenna and the third antenna for non-contact wireless communication and the magnetic field produced by coupling of the second antenna and the fourth antenna, so that coupling between the first antenna and the second antenna does not easily occur.

As a result, it is possible to carry out a first non-contact near-field wireless communication session carried out between the first antenna and the third antenna and a second non-contact near-field wireless communication session carried out between the second antenna and the fourth antenna while reducing influence to each other. In addition, it is possible to eliminate or reduce magnetic materials, such as a ferrite material, so that it is possible to reduce in the entire device size compared with Japanese Unexamined Patent Application Publication No. 2008-301183 and also exhibits an effect of cost reduction for not using a ferrite material. Further, it is also possible to easily carry out positioning of antennas by the structure of fitting convexity and concavity and thus it contributes to improvement in communication accuracy.

Here, a communication block is a module having a communication function. Each antenna may be included inside the communication block and may also be attached outside. When the antennas are disposed inside the communication blocks, they are disposed in the vicinity of the facing surfaces of the communication blocks to the extend allowing non-contact near-field wireless communication between the antennas.

(B) The proximity wireless communication device according to (A) above may also be configured as that the projection and the recess are in a column shape, respectively, and a central axis of the projection and a central axis of the recess match, and the first communication block and the second communication block relatively rotate.

Thus, in the proximity wireless communication device, it is possible to rotatably rotate the second communication block relative to the first communication block. Therefore, it is possible to enhance the convenience of taking an image and transfer of imaging data in, for example, a surveillance camera to monitor 360 degrees and the like.

(C) The proximity wireless communication device according to (B) above may also be configured as that the first communication block further includes a motor and a rotation shaft extending in an axial direction through the central axis of the projection, the rotation shaft has one end coupled to the motor and the other end coupled to the second communication block through the central axis of the recess, and the first communication block and the second communication block relatively rotate by driving of the motor.

Thus, in the proximity wireless communication device, it is possible to rotatably rotate the second communication block relative to the first communication block. Therefore, it is possible to enhance the convenience of taking an image and transfer of imaging data in, for example, a surveillance camera to monitor 360 degrees and the like. In addition, because of the presence of the motor, it is possible to carry out rotation without bothering a user.

(D) The proximity wireless communication device according to (B) above may also be configured as that, among the first antenna and the second antenna, either one is a communication antenna to carry out data communication and the other is a feed antenna to carry out feeding, and the first antenna and the second antenna are apart by a predetermined distance.

Thus, it is possible to suppress influence of feeding that uses greater power to communication, and it is possible to perform both feeding and data communication in parallel.

(E) The proximity wireless communication device according to (D) above may also be configured as that the first antenna is a communication antenna, the second antenna is a feed antenna, the third antenna is a communication antenna, and the fourth antenna is a power receiving antenna.

Usually, feeding is carried out by communication at a frequency lower than the frequency used for data communication. Therefore, in this case, the feed antenna has a diameter larger than the communication antenna. Consequently, the first antenna becomes a communication antenna, the second antenna becomes a feed antenna, the third antenna becomes a communication antenna, and the fourth antenna becomes a power receiving antenna, so that it is possible to easily fabricate the proximity wireless communication device.

(F) The proximity wireless communication device according to (D) above may also be configured as that the first antenna is a feed antenna, the second antenna is a communication antenna, the third antenna is a power receiving antenna, the fourth antenna is a communication antenna, the second antenna includes a plurality of fifth antennas and a plurality of sixth antennas, and the fifth antennas and the sixth antennas are arranged alternately concentrically, the fourth antenna includes a plurality of seventh antennas and a plurality of eighth antennas, and the seventh antennas and the eighth antennas are arranged alternately concentrically, and different communication sessions are carried out between the fifth antennas and the seventh antennas and between the sixth antennas and the eighth antennas.

Thus, it is possible that the proximity wireless communication device carry out two types of data communication, other than communication for feeding, between the first communication block and the second communication block, and it is possible to enhance the convenience of the proximity wireless communication device.

(G) The proximity wireless communication device according to (B) above may also be configured as that the first communication block further includes a first magnetic material between the first antenna and the second antenna.

Thus, it is possible to reduce the possibility that communication carried out between the first antenna and the third antenna affects communication carried out between the second antenna and the fourth antenna. On the contrary, it is also possible to reduce the possibility that communication carried out between the second antenna and the fourth antenna affects communication carried out between the first antenna and the third antenna.

(H) The proximity wireless communication device according to (G) above may also be configured as that the second communication block further includes a second magnetic material between the third antenna and the fourth antenna.

Thus, it is possible to reduce the possibility that communication carried out between the first antenna and the third antenna affects communication carried out between the second antenna and the fourth antenna. On the contrary, it is also possible to reduce the possibility that communication carried out between the second antenna and the fourth antenna affects communication carried out between the first antenna and the third antenna.

(I) The proximity wireless communication device according to (H) above may also be configured as that the first magnetic material and the second magnetic material surround a pair of the first antenna and the third antenna and/or a pair of the second antenna and the fourth antenna.

Thus, it is possible to even more reduce the influence of a magnetic field produced by a pair of antennas to the other pair of antennas. Accordingly, the coupling between pairs of antennas does not occur easily.

(J) The proximity wireless communication device according to (B) above may also be configured to further include a third magnetic material between the first antenna and the third antenna.

Thus, the coupling between the first antenna and the third antenna becomes facilitated and it is possible to carry out communication between the first antenna and the third antenna in a more stable state.

(K) The proximity wireless communication device according to (B) above may also be configured to further include a fourth magnetic material between the second antenna and the fourth antenna.

Thus, the coupling between the second antenna and the fourth antenna becomes facilitated and it is possible to carry out communication between the second antenna and the fourth antenna in a more stable state.

(L) The proximity wireless communication device according to the present disclosure may also include a first housing and a second housing, the first housing including a first antenna and a second antenna and the second housing including a third antenna and a fourth antenna, in which the first antenna and the third antenna carry out non-contact proximity wireless transmission on a first plane facing in proximity, the second antenna and the fourth antenna carry out non-contact proximity wireless transmission on a second plane facing in proximity, and the first plane and the second plane are apart by a predetermined distance.

As described above, the proximity wireless communication device according to the present disclosure is a device that includes at least two housings and rotates or changes positional relationship of the two housings to each other and it is possible to be utilized for a surveillance camera, for example, as a device to carry out communication while enhancing the freedom of driving.

What is claimed is:
1. A proximity wireless communication device comprising:
 a first communication block and a second communication block, wherein the first communication block has a first surface and a projection equipped in a part of the first surface, and a first antenna is disposed on an upper surface of the projection and a second antenna is disposed on the first surface, the second communication block has a second surface and a recess equipped in a part of the second surface, and a third antenna is disposed on a bottom surface of the recess and a fourth antenna is disposed on the second surface, the first surface and the second surface face in proximity, the projection and the recess fit, and the upper surface of the projection and the bottom surface of the recess face in proximity, and non-contact near-field wireless communication is carried out between the first antenna and the third antenna and between the second antenna and the fourth antenna.

2. The proximity wireless communication device according to claim 1, wherein the projection and the recess are in a column shape, respectively, and a central axis of the projection and a central axis of the recess match, and the first communication block and the second communication block relatively rotate.

3. The proximity wireless communication device according to claim 2, wherein the first communication block further includes a motor and a rotation shaft extending in an axial direction through the central axis of the projection, the rotation shaft has one end coupled to the motor and the other end coupled to the second communication block through the central axis of the recess, and the first communication block and the second communication block relatively rotate by driving of the motor.

4. The proximity wireless communication device according to claim 1, wherein between the first antenna and the second antenna, either one is a communication antenna to carry out data communication and the other is a feed antenna to carry out feeding, and the first antenna and the second antenna are apart by a predetermined distance.

5. The proximity wireless communication device according to claim 4, wherein the first antenna is a communication antenna,
the second antenna is a feed antenna,
the third antenna is a communication antenna, and
the fourth antenna is a power receiving antenna.

6. The proximity wireless communication device according to claim 2, wherein the first antenna is a feed antenna,
the second antenna is a communication antenna,
the third antenna is a power receiving antenna,
the fourth antenna is a communication antenna, the second antenna includes a plurality of fifth antennas and a plurality of sixth antennas, and the fifth antennas and the sixth antennas are arranged alternately concentrically, the fourth antenna includes a plurality of seventh antennas and a plurality of eighth antennas, and the seventh antennas and the eighth antennas are arranged alternately concentrically, and different communication sessions are carried out between the fifth antennas and the seventh antennas and between the sixth antennas and the eighth antennas.

7. The proximity wireless communication device according to claim 1, wherein the first communication block further includes a first magnetic material between the first antenna and the second antenna.

8. The proximity wireless communication device according to claim 1, wherein the second communication block further includes a second magnetic material between the third antenna and the fourth antenna.

9. The proximity wireless communication device according to claim 1, wherein the first magnetic material and the second magnetic material surround a pair of the first antenna and the third antenna and/or a pair of the second antenna and the fourth antenna.

10. The proximity wireless communication device according to claim 1, further comprising:

a third magnetic material between the first antenna and the third antenna.

11. The proximity wireless communication device according to claim 1, further comprising:

a fourth magnetic material between the second antenna and the fourth antenna.

* * * * *